(12) United States Patent
Kinugasa et al.

(10) Patent No.: US 12,105,229 B2
(45) Date of Patent: Oct. 1, 2024

(54) RADIATION DETECTION APPARATUS AND SAMPLE ANALYSIS APPARATUS

(71) Applicant: JEOL Ltd., Tokyo (JP)

(72) Inventors: Genki Kinugasa, Tokyo (JP); Kouji Miyatake, Tokyo (JP); Kota Yanagihara, Tokyo (JP); Ryuichi Isobe, Tokyo (JP)

(73) Assignee: JEOL Ltd., Tokyo (JP)

( * ) Notice: Subject to any disclaimer, the term of this patent is extended or adjusted under 35 U.S.C. 154(b) by 99 days.

(21) Appl. No.: 17/964,340

(22) Filed: Oct. 12, 2022

(65) Prior Publication Data

US 2023/0112252 A1    Apr. 13, 2023

(30) Foreign Application Priority Data

Oct. 13, 2021    (JP) ................. 2021-168129

(51) Int. Cl.
*G01T 1/17* (2006.01)
*G01T 1/24* (2006.01)
*G01T 1/36* (2006.01)

(52) U.S. Cl.
CPC ............... *G01T 1/17* (2013.01); *G01T 1/24* (2013.01); *G01T 1/36* (2013.01)

(58) Field of Classification Search
CPC ............... G01T 1/17; G01T 1/24; G01T 1/36
See application file for complete search history.

(56) References Cited

U.S. PATENT DOCUMENTS

| 4,727,256 A * | 2/1988 | Kumazawa ............. G01T 1/247 250/370.1 |
| 5,970,720 A | 10/1999 | Katagiri et al. |
| 2004/0158440 A1* | 8/2004 | Warburton ............... G01T 1/17 702/190 |
| 2006/0253512 A1* | 11/2006 | Nikitin ...................... G06G 7/02 708/400 |
| 2009/0114826 A1 | 5/2009 | Takahashi et al. |
| 2010/0282974 A1 | 11/2010 | Takahashi et al. |
| 2011/0215254 A1 | 9/2011 | Takahashi et al. |

(Continued)

FOREIGN PATENT DOCUMENTS

| JP | H1225229 A | 9/1989 |
| JP | H828981 A | 2/1996 |

(Continued)

OTHER PUBLICATIONS

Office Action issued in JP2021168129 on Aug. 29, 2023.

*Primary Examiner* — Hugh Maupin
(74) *Attorney, Agent, or Firm* — The Webb Law Firm

(57) ABSTRACT

There is provided a radiation detection apparatus capable of effectively discriminating between noise and X-ray signal. The radiation detection apparatus includes a detector for detecting radiation and producing a detector output signal, a first differential filter having a time constant and operative to differentiate and convert the detector output signal into a first pulsed signal, a second differential filter having a time constant greater than that of the first differential filter and operative to differentiate and convert the detector output signal into a second pulsed signal, and a noise detection section for detecting noise based on the difference in timing between peaks of the first and second pulsed signals.

7 Claims, 18 Drawing Sheets

(56) References Cited

U.S. PATENT DOCUMENTS

| | | | |
|---|---|---|---|
| 2012/0305784 A1* | 12/2012 | Wang | G01T 1/17 |
| | | | 250/336.1 |
| 2012/0326045 A1* | 12/2012 | Seino | G01T 1/247 |
| | | | 250/370.07 |
| 2015/0083913 A1 | 3/2015 | Kinugasa | |
| 2016/0070093 A1* | 3/2016 | Simpson | G01N 15/1429 |
| | | | 348/80 |
| 2019/0219713 A1* | 7/2019 | Steadman Booker | ....... |
| | | | G01N 23/041 |
| 2022/0236430 A1* | 7/2022 | Hatakeyama | G01T 1/2008 |

FOREIGN PATENT DOCUMENTS

| | | |
|---|---|---|
| JP | H10197643 A | 7/1998 |
| JP | 2013137329 A | 7/2013 |
| JP | 2014169877 A | 9/2014 |
| JP | 201564277 A | 4/2015 |

* cited by examiner

RADIATION DETECTION APPARATUS AND SAMPLE ANALYSIS APPARATUS

CROSS REFERENCE TO RELATED APPLICATION

This application claims priority to Japanese Patent Application No. 2021-168129 filed Oct. 13, 2021, the disclosure of which is hereby incorporated by reference in its entirety.

BACKGROUND OF THE INVENTION

1. Field of the Invention

The present invention relates to a radiation detection apparatus and a sample analysis apparatus.

2. Description of the Related Art

A radiation detection apparatus is an apparatus for detecting electromagnetic radiations such as X-rays and gamma rays. An X-ray detection apparatus for detecting X-rays is known as a radiation detection apparatus.

It is known that X-ray detection apparatuses are classified into energy dispersive X-ray spectrometers (EDS) and wavelength dispersive X-ray spectrometers (WDS). An energy dispersive X-ray spectrometer detects X-rays emitted from a sample with a semiconductor detector, converts the detected X-rays into an electrical signal, and performs a spectroscopic analysis. This X-ray spectrometer has the problem that noise events are regarded as X-ray events (signal events) and thus peaks corresponding to elements not included in the sample are observed.

For example, JP-A-2014-169877 discloses an X-ray detection apparatus having an X-ray detector for producing a staircase waveform, a differential filter operating to differentiate it into a pulsed signal, and a noise event detection section which detects noise events by making use of the fact that each noise peak is narrower in width than each peak of X-ray signal.

It is desirable for an X-ray detection apparatus to be able to effectively discriminate between noise and X-ray signal. Especially, low-energy X-rays are detected at low efficiency and often produce only small peaks. Therefore, in an X-ray spectrum, low-energy X-ray peaks may overlap noise peaks and thus are unidentifiable.

SUMMARY OF THE INVENTION

One aspect of the radiation detection apparatus associated with the present invention comprises: a detector operative to detect radiation and to produce a detector output signal; a first differential filter having a time constant and operative to differentiate and convert the detector output signal into a first pulsed signal; a second differential filter having a time constant greater than that of the first differential filter and operative to differentiate and convert the detector output signal into a second pulsed signal; and a noise detection section for detecting noise based on a difference in timing between peaks of the first and second pulsed signals.

In this radiation detection apparatus, the noise detection section detects noise based on the difference between the timings of peaks of the first and second pulsed signals and, therefore, it is possible to effectively discriminate between noise and X-ray signal.

Another aspect of the radiation detection apparatus associated with the present invention comprises: a detector operative to detect radiation and to produce a detector output signal; a first differential filter having a time constant and operative to differentiate and convert the detector output signal into a first pulsed signal; a second differential filter having a time constant greater than that of the first differential filter and operative to differentiate and convert the detector output signal into a second pulsed signal; and a noise detection section for detecting noise based on peak intensities of the first and second pulsed signals.

In this radiation detection apparatus, the noise detection section detects noise based on the peak intensities of the first and second pulsed signals and, therefore, it is possible to effectively discriminate between noise and X-ray signal.

One aspect of the sample analysis apparatus associated with the present invention includes any one of the foregoing radiation detection apparatuses.

DESCRIPTION OF THE INVENTION

Non-limiting embodiments of the present invention are hereinafter described in detail with reference to the drawings. It is to be understood that the embodiments provided below do not unduly restrict the scope and content of the present invention delineated by the appended claims and that not all the configurations described below are essential constituent components of the invention.

1. First Embodiment

1.1. Configuration of X-ray Detection Apparatus

Figure 1:
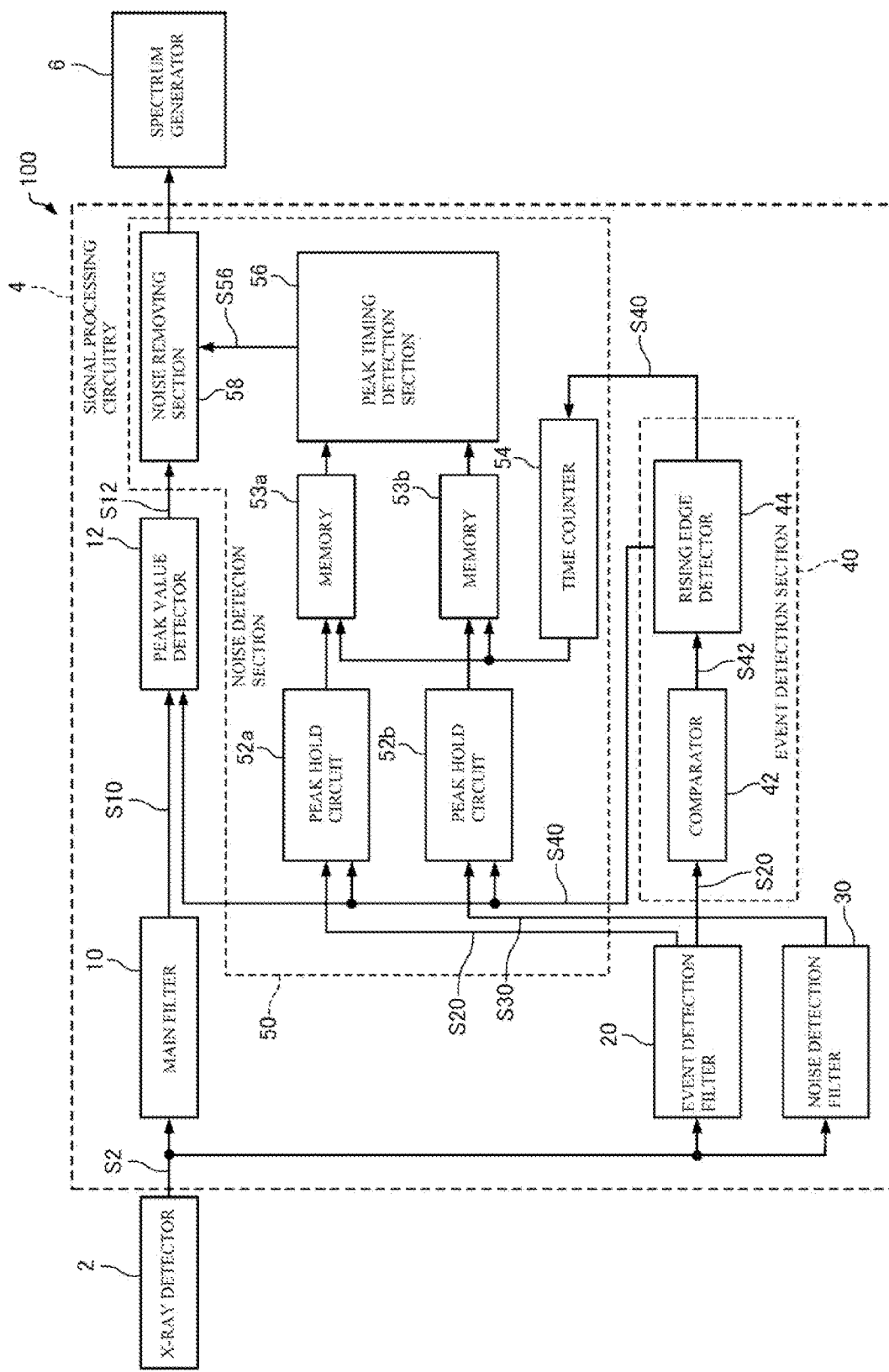
FIG. 1 is a diagram showing the configuration of an X-ray detection apparatus associated with a first embodiment of the present invention.

The configuration of an X-ray detection apparatus associated with a first embodiment of the present invention is first described by referring to FIG. 1 which shows the configuration of the X-ray detection apparatus, 100. As shown, the X-ray detection apparatus 100 includes an X-ray detector 2, signal processing circuitry 4, and a spectrum generator 6.

The X-ray detector 2 is an energy dispersive spectrometer and operates to detect X-rays. The X-ray detector 2 is a semiconductor detector, such as a Si(Li) detector, a silicon drift detector (SDD), or the like, for example. The output from the X-ray detector 2 is amplified by an amplifier, for example, and provided.

Figure 2:
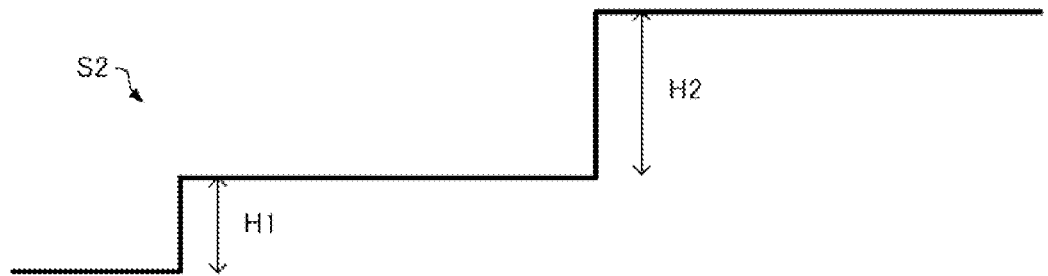
FIG. 2 is a schematic waveform diagram of one example of output signal from an X-ray detector.

FIG. 2 is a schematic waveform diagram of one example of an output signal S2 from the X-ray detector 2. In FIG. 2, the vertical direction (heightwise direction) represents X-ray energy, while the horizontal direction indicates time.

The X-ray detector 2 detects X-rays and outputs a staircase waveform having amplitude steps whose heights correspond to X-ray energies. In the example of FIG. 2, the X-ray detector 2 detects an X-ray having an energy corresponding to a height H1 and an X-ray having an energy corresponding to a height H2 in turn and produces the output signal S2 having steps of H1 and H2, respectively.

As shown in FIG. 1, the output signal S2 from the X-ray detector 2 is applied to the signal processing circuitry 4, more particularly, to a main filter 10, an event detection filter 20, and a noise detection filter 30.

The signal processing circuitry 4 includes a peak value detector 12, an event detection section 40, and a noise detection section 50, as well as the main filter 10, the event detection filter 20 (one example of a first differential filter) and the noise detection filter 30 (one example of a second differential filter).

Figure 3:
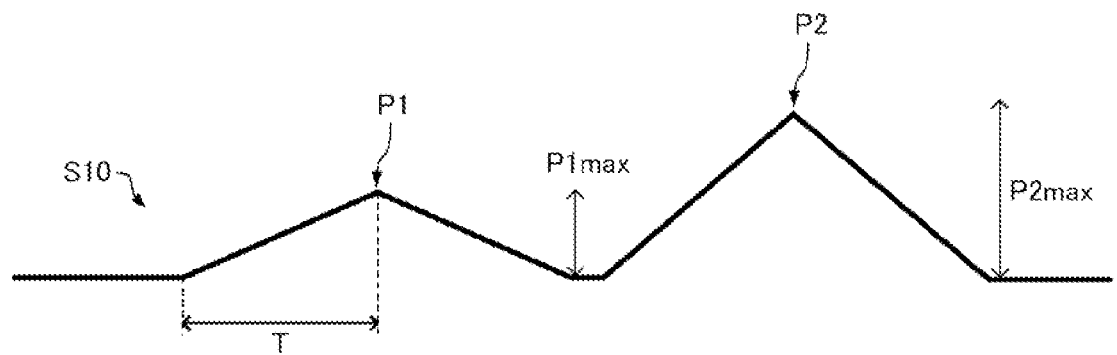
FIG. 3 is a schematic waveform diagram of one example of a main pulsed signal.

The main filter 10 differentiates (takes the first derivative) and converts the output signal S2 from the X-ray detector 2 into a main pulsed signal S10 which has peak values corresponding to the heights of the steps of the output signal S2. One example of the main pulsed signal S10 is schematically shown in FIG. 3. The main pulsed signal S10 of FIG. 3 has a peak P1 of crest value (maximum value) P1 max corresponding to the height H1 of one step of the output signal S2 shown in FIG. 2. The main pulsed signal S10 also has a peak P2 of crest value P2 max corresponding to the height H2 of another step of the output signal S2 of FIG. 2. The main filter 10 is a differential filter having a differential time constant of T.

The event detection filter 20 differentiates (takes the first derivative) the output signal S2 from the X-ray detector 2 and converts it into the first pulsed signal S20 which has peak values (crest values) corresponding to the heights of the steps of the output signal S2.

Figure 4:
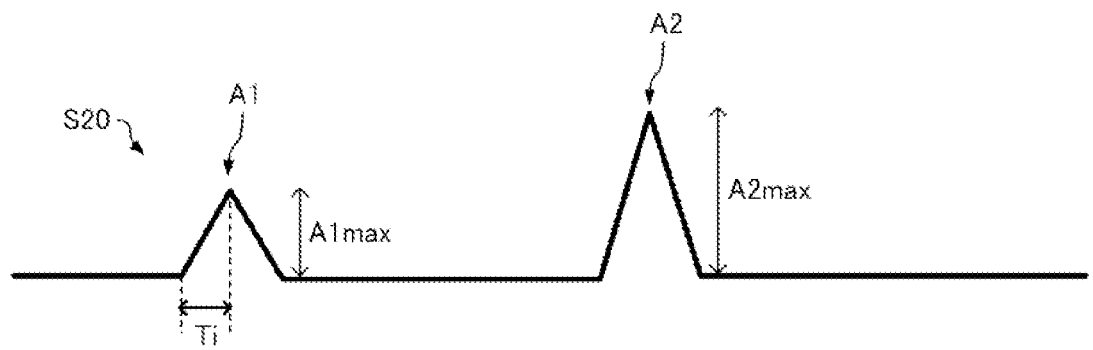
FIG. 4 is a schematic waveform diagram of one example of a first pulsed signal.

One example of the first pulsed signal S20 is schematically shown in FIG. 4. The first pulsed signal S20 of FIG. 4 has a peak A1 of crest value A1 max corresponding to the height H1 of one step of the output signal S2 shown in FIG. 2. The first pulsed signal S20 of FIG. 4 also has a peak A2 of crest value A2 max corresponding to the height H2 of another step of the output signal S2 of FIG. 2. The event detection filter 20 is a differential filter having a time constant of Ti smaller than the time constant T of the main filter 10.

The noise detection filter 30 differentiates (takes the first derivative) the output signal S2 from the X-ray detector 2 and converts it into a second pulsed signal S30 which has peaks with crest values corresponding to the heights of the steps of the output signal S2.

Figure 5:
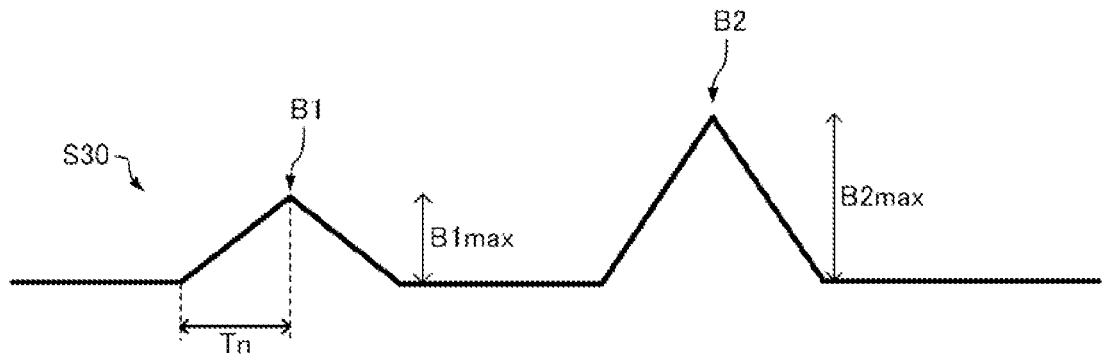
FIG. 5 is a schematic waveform diagram of one example of a second pulsed signal.

One example of the second pulsed signal S30 is schematically shown in FIG. 5. The second pulsed signal S30 of FIG. 5 has a pulse B1 having a crest value B1 max corresponding to the height H1 of one step of the output signal S2 shown in FIG. 2. The second pulsed signal S30 of FIG. 5 also has a pulse B2 having a crest value of B2 max corresponding to the height H2 of another step of the output signal S2 of FIG. 2. The noise detection filter 30 is a differential filter having a time constant of Tn that is smaller than the time constant T of the main filter 10 but greater than the time constant Ti of the event detection filter 20.

Whenever the X-ray detector 2 detects an X-ray, the event detection section 40 produces a single event signal. When the first pulsed signal S20 exceeds a threshold value, the event detection section 40 produces an event signal S40. The event detection section 40 includes a comparator 42 and a rising edge detector 44.

The comparator 42 compares the first pulsed signal S20 to a reference signal having a threshold value of TH2. The rising edge detector 44 detects the rising edge of the output signal from the comparator 42.

Figure 6:
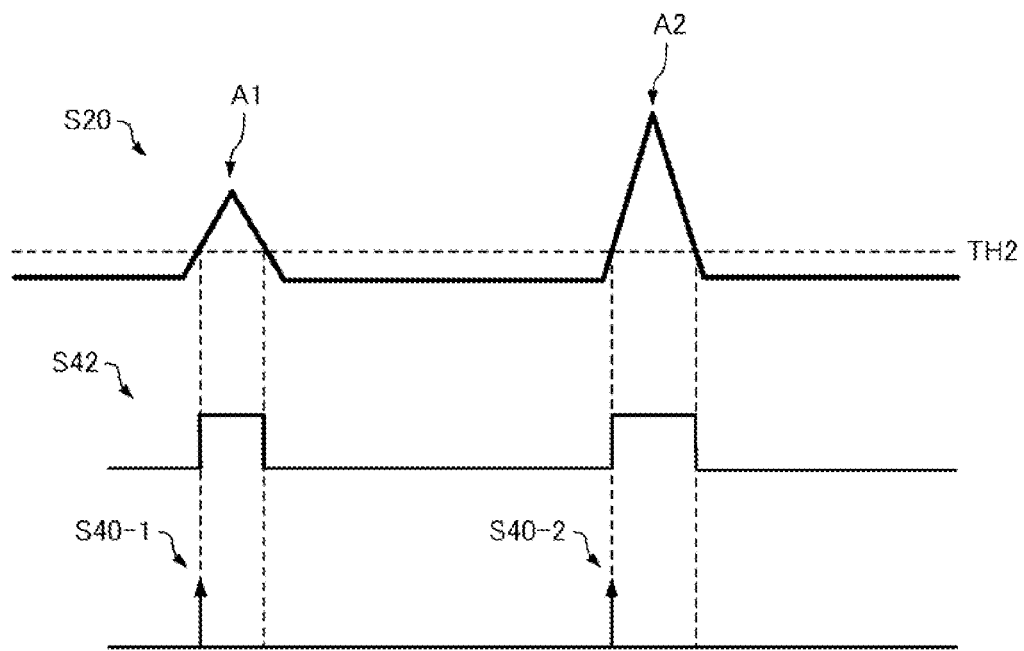
FIG. 6 is a waveform diagram illustrating processing performed by an event detection section.

FIG. 6 illustrates the processing performed by the event detection section 40. The comparator 42 produces an output signal S42 which goes high when the first pulsed signal S20 exceeds the threshold value TH2 and goes low when the first pulsed signal S20 is less than the threshold value TH2 which can be set to any arbitrary value.

The rising edge detector 44 detects the rising edges of the output signal S42 from the comparator 42. When the output signal S42 from the comparator 42 rises as shown in FIG. 6, the rising edge detector 44 produces the event signal S40 which is a given pulsed signal, for example. In the example shown in FIG. 6, the rising edge detector 44 produces an event signal S40-1 in response to the peak A1 and an event signal S40-2 in response to the peak A2.

Upon being triggered by the event signal S40, the peak value detector 12 starts to detect peak values of the main pulsed signal S10 and outputs a detection signal S12 including information about the peak values of the main pulsed signal S10.

Figure 7:
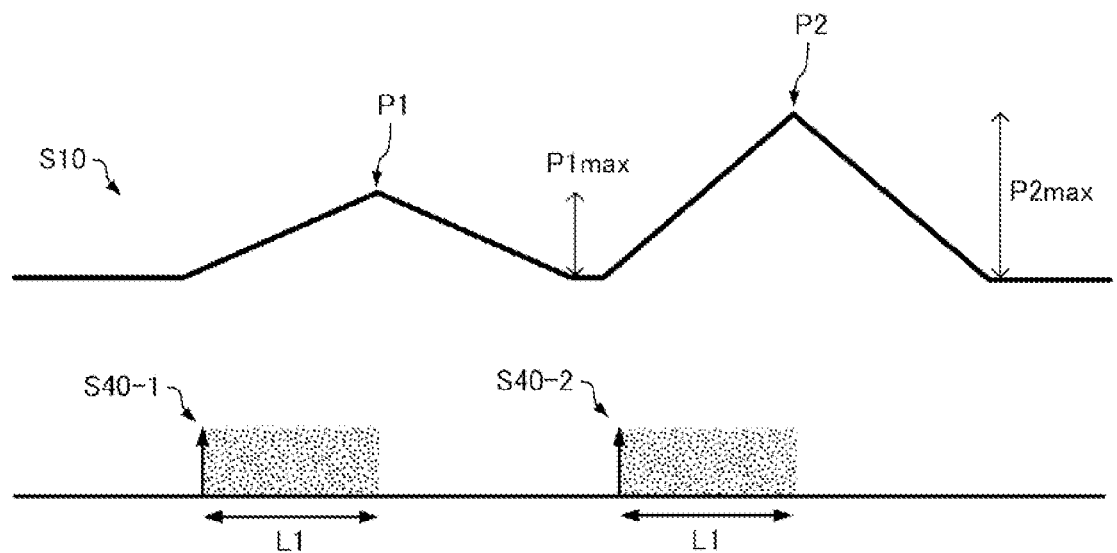
FIG. 7 is a waveform diagram illustrating processing performed by a pulse height detection section.

FIG. 7 illustrates the processing performed by the peak value detector 12. Upon receipt of the event signal S40 as shown, the peak value detector 12 starts to detect peak values (maximum values) of the main pulsed signal S10 within a detection time L1 since the start of the detection. The detection time L1 is set according to the time constant T of the main filter 10. In the example shown in FIG. 7, upon occurrence of the first event signal S40-1, the peak value detector 12 starts to detect the peak value P1 max of the peak P1. Upon occurrence of the second event signal S40-2, the detector 12 starts to detect the peak value P2 max of the peak P2.

The noise detection section 50 detects noise. That is, the noise detection section 50 discriminates between noise and X-ray signal. As shown in FIG. 6, when the threshold value TH2 is exceeded, the event detection section 40 produces the event signal S40. Because the peak value of the first pulsed signal S20 is in proportion to the magnitude of X-ray energy, in order to detect X-rays having low energies, for example, less than 100 eV, it is necessary to set the threshold value TH2 at low values. In this case, however, noise level will exceed the threshold value TH2, so that the event detection section 40 will misdetect noise events as signal events. Therefore, in the X-ray detection apparatus 100, the noise detection section 50 detects noise events by a method described in the following.

Figure 8:
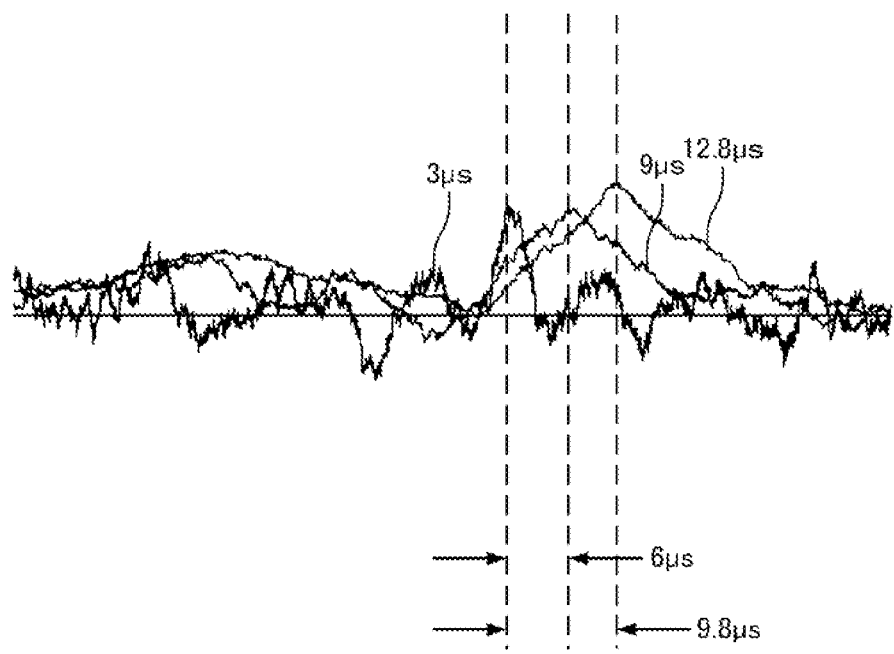
FIG. 8 is a waveform diagram of output signals from three differential filters having different time constants.
Figure 9:
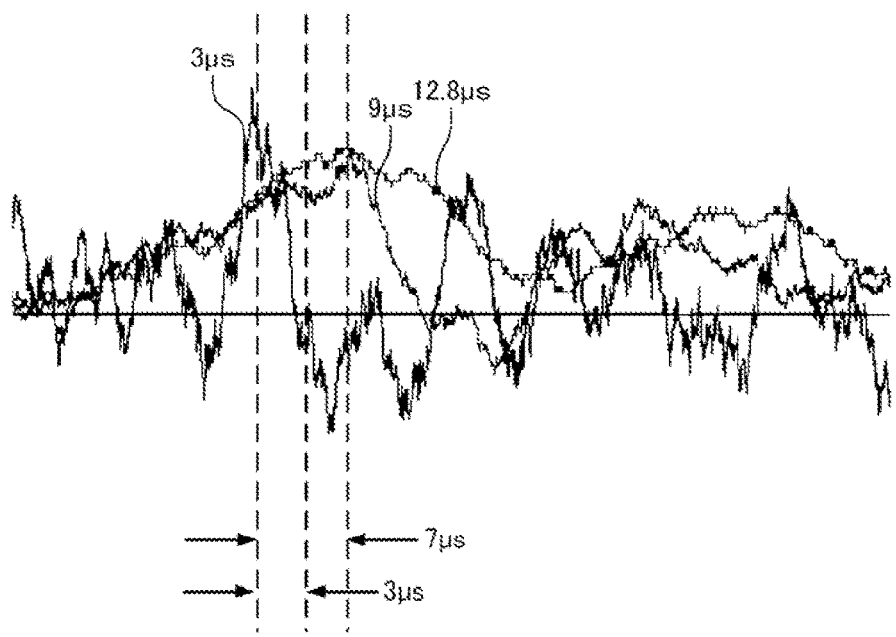
FIG. 9 is a waveform diagram similar to FIG. 8, but in which noise signals are applied.

FIGS. 8 and 9 show the output signals from three differential filters having different time constants, i.e., 3 μs, 9 μs, and 12.8 μs. FIG. 8 shows the results of the differentiation of X-ray signals. FIG. 9 shows the results of differentiation of noises.

As shown in FIG. 8, when an X-ray signal is differentiated, the differences among the timings of the peaks of the output signals from the differential filters are coincident with the differences among their time constants. For example, the difference in timing between the peak of the output signal from the differential filter having a time constant of 3 μs and the peak of the output signal from the differential filter having a time constant of 9 μs is 6 μs. The difference in timing between the peak of the output signal from the differential filter having a time constant of 3 μs and the peak of the output signal from the differential filter having a time constant of 12.8 μs is 9.8 μs.

On the other hand, where noise is differentiated, as shown in FIG. 9, the differences in timing among the peaks of the output signals from the differential filters may not be coincident with the differences among their time constants.

In this way, it is possible to discriminate between noise and X-ray signal by the differences in timing among the peaks of the output signals from the differential filters having different time constants.

The noise detection section 50 measures the timing of the peak of the first pulsed signal S20 and the timing of the peak of the second pulsed signal S30 while using the timing of occurrence of the event signal S40 as a starting point. Then, the noise detection section 50 detects noise based on the difference in timing between the peak of the first pulsed signal S20 and the peak of the second pulsed signal S30 and on the difference in time constant between the event detection filter 20 and the noise detection filter 30.

As shown in FIG. 1, the noise detection section 50 includes a peak hold circuit 52a, another peak hold circuit 52b, memories 53a, 53b, a time counter 54, a peak timing detection section 56, and a noise removing section 58.

Figure 10:
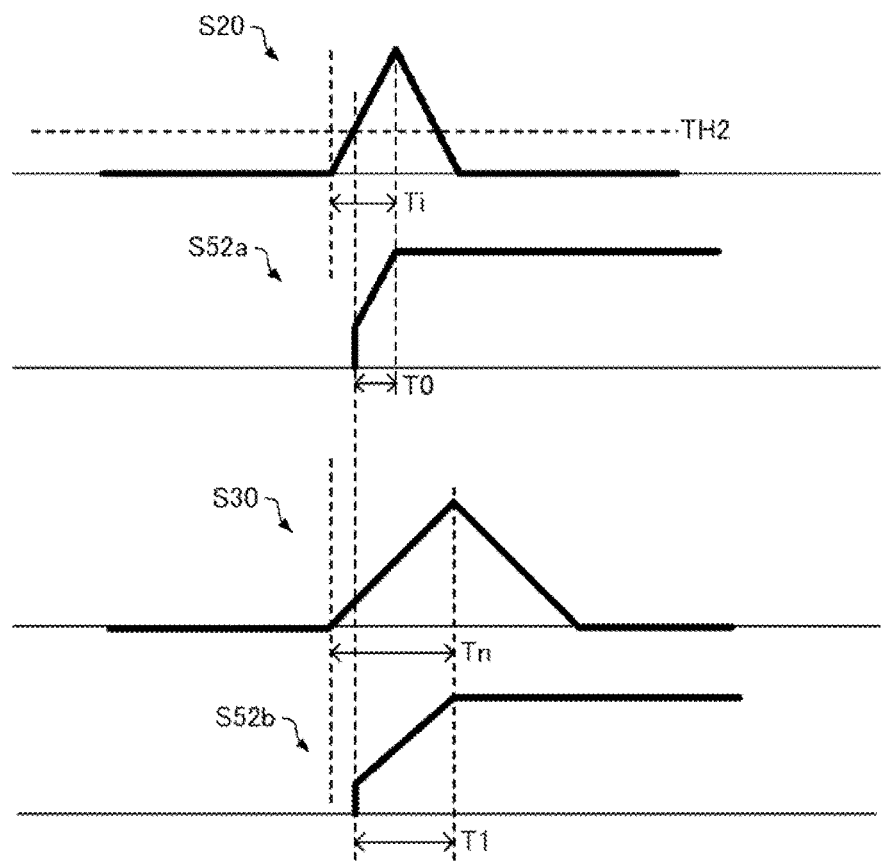
FIGS. 10 and 11 are waveform diagrams illustrating processing performed by a noise detection section.
Figure 11:
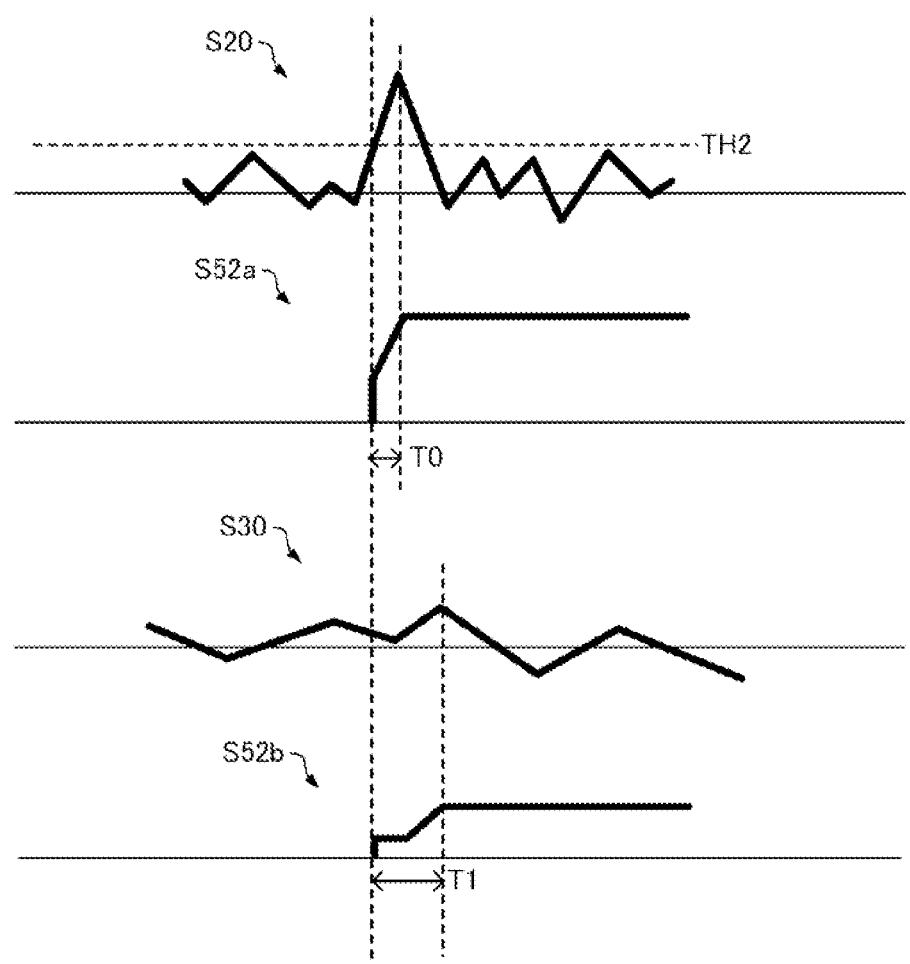

FIGS. 10 and 11 illustrate the processing performed by the noise detection section 50. FIG. 10 illustrates processing of X-ray signal. FIG. 11 illustrates processing of noise.

The event detection filter 20 differentiates the output signal S2 from the X-ray detector 2 and converts it into the first pulsed signal S20. At the moment when the first pulsed signal S20 exceeds the threshold value TH2 and the event signal S40 is generated, the peak hold circuit 52a starts to detect the peak value (maximum value) of the first pulsed signal S20. The time counter 54 starts to measure a period of time from the occurrence of the event signal S40 to the detection of a peak of the first pulsed signal S20. The timing T0 of the peak value (maximum value) of the first pulsed signal S20 measured by the time counter 54, i.e., a time from when the first pulsed signal S20 exceeds the threshold value TH2 to when the peak of the first pulsed signal S20 is detected, is stored in the memory 53a.

When the first pulsed signal S20 exceeds the threshold value TH2 and the event signal S40 is generated, the peak hold circuit 52b begins to detect the peak value (maximum value) of the second pulsed signal S30. The time counter 54 starts to measure the time from when the event signal S40 is generated to when a peak is detected. The timing T1 of the peak value (maximum value) of the second pulsed signal S30 measured by the time counter 54, i.e., a time from when the first pulsed signal S20 exceeds the threshold value TH2 to when a peak of the second pulsed signal S30 is detected, is stored in the memory 53b.

Figure 12:
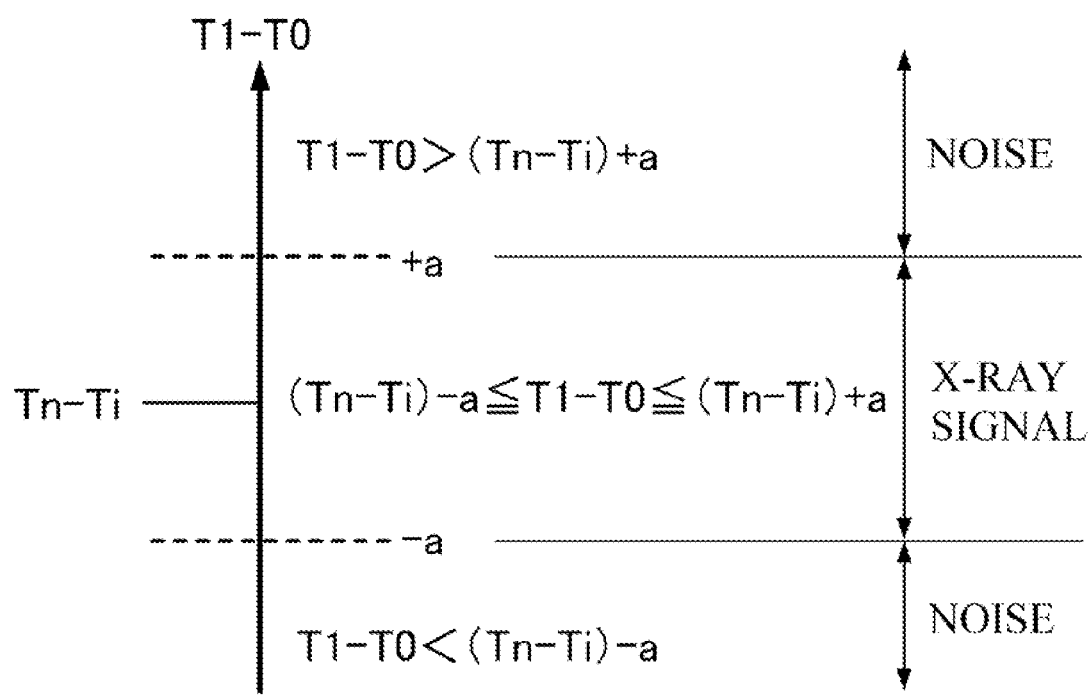
FIG. 12 is a waveform diagram illustrating processing performed by a peak timing detection section.

FIG. 12 illustrates the processing performed by the peak timing detection section 56. It is assumed that the event detection filter 20 has a time constant of Ti and that the noise detection filter 30 has a time constant of Tn. In the case of X-ray signals, the difference between the timings T1 and T0, i.e., T1−T0, is substantially coincident with the difference between the time constants Tn and Ti, i.e., Tn−Ti. On the other hand, in the case of noise, the timing difference T1−T0 does not always agree in value with the time constant difference Tn−Ti.

Accordingly, a given range is set which is delineated by ±a and which is centered at the time constant difference Tn−Ti. Events lying outside this range are regarded as noise events. The peak timing detection section 56 makes a decision as to whether the timing difference T1−T0 falls within the range from (Tn−Ti)−a to (Tn−Ti)+a. If the peak timing detection section 56 determines that the timing difference T1−T0 falls within this range, the detector 56 does not output the noise event signal S56. If not so, the detection section 56 outputs the noise event signal S56. The noise event signal S56 is used to identify that an event has been induced by noise.

The value of the parameter a defining the range can be set at will. As the parameter a decreases, noise can be discerned with greater accuracy. However, if the parameter a decreases excessively, even X-ray signals may be misdetected as noise with higher possibility.

If the peak timing detection section 56 fails to output the noise event signal S56, the noise removing section 58 outputs the detection signal S12 including information about the peak values detected by the peak value detector 12 to the spectrum generator 6. If the peak timing detection section 56 outputs the noise event signal S56, the noise removing section 58 does not output the detection signal S12 including the information about the peak values detected by the peak value detector 12 to the spectrum generator 6.

If the detection signal S12 including the information about the peak values is entered, the spectrum generator 6 discriminates the peaks according to their crest values, count them, and generates an X-ray spectrum (which may also be referred to as an energy spectrum or a pulse height distribution graph) in which each crest value (i.e., X-ray energy) is plotted on the horizontal axis and each number of counts is plotted on the vertical axis. The functions of the spectrum generator 6 can be implemented with a personal computer (PC), for example.

In the foregoing description, the signal processing circuitry 4 has the single noise detection filter 30. Alternatively, the signal processing circuitry 4 may have plural noise detection filters 30 having different time constants. In this case, the noise detection section 50 may detect noise by calculating the difference in timing between the peaks of the first pulsed signal S20 and of the second pulsed signal S30 for each noise detection filter 30.

1.2. Operation of X-ray Detection Apparatus

Figure 13:
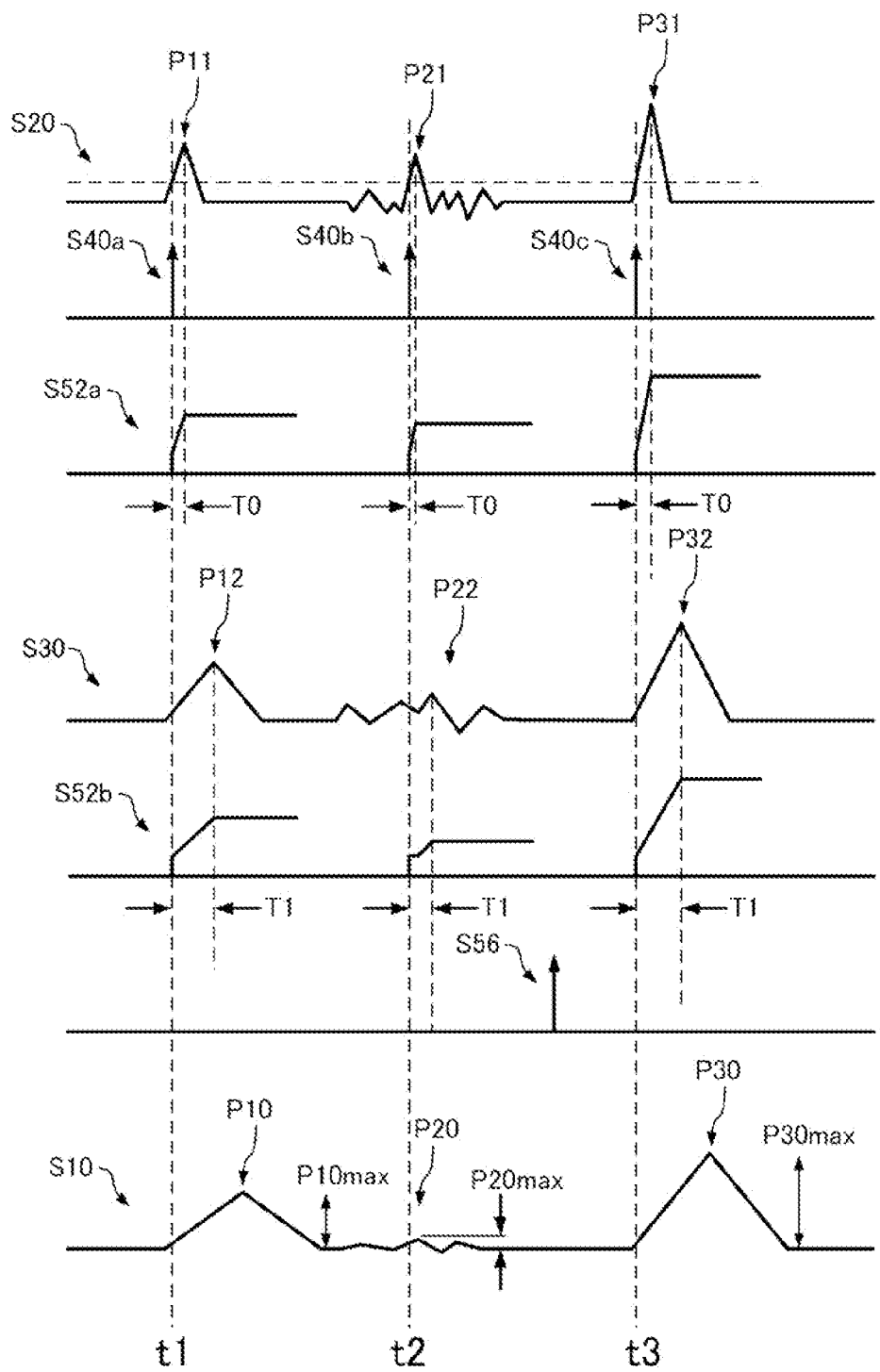
FIG. 13 is a waveform diagram illustrating processing performed by signal processing circuitry of the X-ray detection apparatus.

FIG. 13 illustrates the processing of the signal processing circuitry 4 of the X-ray detection apparatus 100. When an X-ray impinges on the X-ray detector 2, an amplitude step appears on the output signal S2 from the X-ray detector 2 according to the energy of the X-ray.

The main filter 10, event detection filter 20, and noise detection filter 30 differentiate the output signal S2. As a result, a peak P10 appears on the main pulsed signal S10. A peak P11 appears on the first pulsed signal S20. A peak P12 appears on the second pulsed signal S30.

In the event detection section 40, the intensity of the first pulsed signal S20 exceeds the threshold value TH2 and an event signal S40a is produced at instant t1, whereupon the peak hold circuit 52a starts to detect the maximum value of the first pulsed signal S20, and the peak hold circuit 52b starts to detect the maximum value of the second pulsed signal S30. The time counter 54 begins to measure the timing of detection of the maximum value. The timing T0 of the crest value (maximum value) of the first pulsed signal S20 measured by the time counter 54 is stored in the memory 53a. The timing T1 of the crest value (maximum value) of the second pulsed signal S30 is stored in the memory 53b.

The peak timing detection section 56 calculates the difference between the timings T1 and T0 and makes a decision as to whether this difference T1−T0 falls within the range from (Tn−Ti)−a to (Tn−Ti)+a. For the event occurring at instant t1, the difference T1−T0 falls within this range and so the peak timing detection section 56 does not output the noise event signal S56.

At the timing of the occurrence of the event signal S40a, the peak value detector 12 starts to detect peak values of the main pulsed signal S10, performs detection of the peak values only during a detection time L1, and outputs the detection signal S12 including information about a pulse height value (crest value) P10 max of the main pulsed signal S10. Since the noise event signal S56 is not entered, the noise removing section 58 outputs the detection signal S12 including the information about the pulse height value P10 max to the spectrum generator 6. Consequently, the information about the pulse height value P10 max of the peak P10 is sent to the spectrum generator 6.

The operation of the apparatus when noise is introduced in the output signal S2 from the X-ray detector 2 is next described. The main filter 10, event detection filter 20, and noise detection filter 30 differentiate the output signal S2. As a result, peaks P20, P21, and P22 appear respectively on the main pulsed signal S10, first pulsed signal S20, and second pulsed signal S30.

In the event detection section 40, the intensity of the first pulsed signal S20 exceeds the threshold value TH2 and an event signal S40b occurs at instant t2. At the timing of the occurrence of the event signal S40b, the peak hold circuit 52a starts to detect maximum values of the first pulsed signal S20, and the peak hold circuit 52b begins to detect maximum values of the second pulsed signal S30. Also, the time counter 54 begins to measure the timings at which the maximum values are detected. The timing T0 of the peak of the first pulsed signal S20 measured by the time counter 54 is stored in the memory 53a. The timing T1 of the peak of the second pulsed signal S30 is stored in the memory 53b.

The peak timing detection section 56 calculates the difference, T1−T0, and makes a decision as to whether the calculated difference, T1−T0, falls within the range (Tn−Ti)−a to (Tn−Ti)+a. For the event occurring at instant t2, the difference, T1−T0, does not fall within this range and so the peak timing detection section 56 outputs the noise event signal S56.

At the timing of the generation of the event signal S40b, the peak value detector 12 starts to detect a peak value (crest value) of the main pulsed signal S10, performs detection of the peak value only during the detection time L1, and outputs the detection signal S12 including information about the peak value P20 max of the main pulsed signal S10. Because the noise event signal S56 is entered, the noise removing section 58 does not output the detection signal S12 to the spectrum generator 6. Accordingly, the information about the peak value P20 max of the peak P20 is not sent to the spectrum generator 6.

Similar processing is performed for the event occurring at instant t3. The main filter 10, event detection filter 20, and noise detection filter 30 differentiate the output signal S2. Consequently, peaks P30, P31, and P32 appear on the main pulsed signal S10, first pulsed signal S20, and second pulsed signal S30, respectively. For the event (i.e., event signal S40c) occurring at instant t3, the difference (T1−T0) falls within the range from (Tn−Ti)−a to (Tn−Ti)+a and so the peak timing detection section 56 does not output the noise event signal S56. Therefore, information about the crest value P30 max of the peak P30 is sent to the spectrum generator 6.

By repeatedly carrying out the above-described processing, information about the peak values is sent from the signal processing circuitry 4 only when the noise detection section 50 determines that there are events caused by X-ray signals. In consequence, the spectrum generator 6 can generate a spectrum while suppressing the effects of noise.

1.3. Advantageous Effects

The X-ray detection apparatus 100 includes: the X-ray detector 2; the event detection filter 20 for differentiating the output signal S2 from the X-ray detector 2 and converting the signal into the first pulsed signal S20; the noise detection filter 30 having a time constant greater than that of the event detection filter 20 and operative to differentiate the output signal S2 from the X-ray detector 2 and to convert the signal into the second pulsed signal S30; and the noise detection section 50 for detecting noise based on the difference, T0−T1, between the timing T0 of the peak of the first pulsed signal S20 and the timing T1 of the peak of the second pulsed signal S30. Therefore, the X-ray detection apparatus 100 can effectively discriminate between noise and X-ray signal.

For example, where X-rays having low energies are detected, the threshold value TH2 of FIG. 6 for the event detection filter 20 must be set low, in which case, however, the event detection filter 20 will detect even small noise as an event. For this reason, in the X-ray detection apparatus 100, the noise detection section 50 detects noise based on the difference (T1−T0). As a result, if the threshold value TH2 is set low, the effects of noises on the X-ray spectrum can be reduced.

Figure 14:
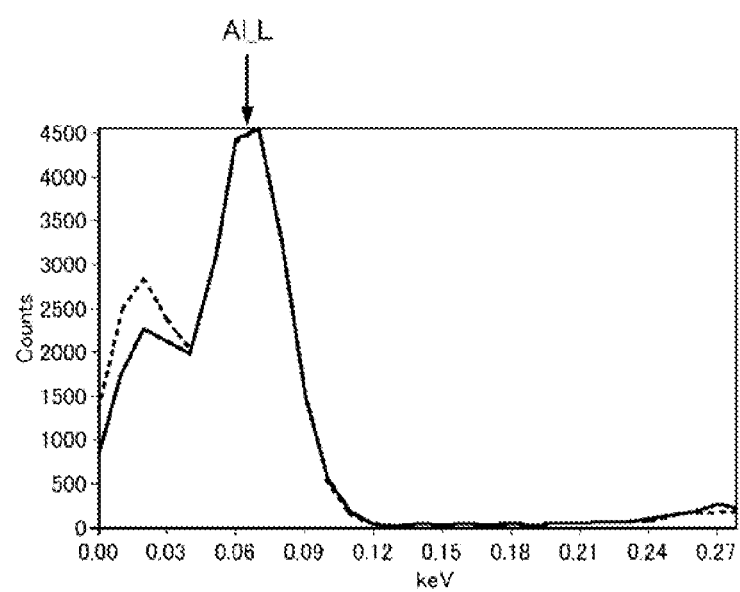
FIG. 14 shows X-ray spectra taken with X-ray detection apparatuses.

FIG. 14 shows plural X-ray spectra including an X-ray spectrum derived with the X-ray detection apparatus 100, the spectrum being indicated by a solid line. As a comparative example, an X-ray spectrum derived with an X-ray detection apparatus not equipped with the noise detection section 50 is indicated by a broken line in FIG. 14.

As shown in FIG. 14, in the X-ray detection apparatus 100, a peak arising from noise appearing at low energies can be reduced. Therefore, in the X-ray detection apparatus 100, X-ray peaks with low energies can be made more discernible, and the sensitivity to low-energy X-rays can be improved.

In the X-ray detection apparatus 100, the noise detection section 50 detects noise by comparing the peak timing difference, T1−T0, (i.e., the difference between the timing T0 of the peak of the first pulsed signal S20 and the timing T1 of the peak of the second pulsed signal S30) and the time constant difference, Tn−Ti, (i.e., the difference between the time constant Ti of the event detection filter 20 and the time constant Tn of the noise detection filter 30). As described previously, in the case of an X-ray signal, the peak timing difference, T1−T0, is substantially coincident with the time constant difference, Tn−Ti. In the case of noise, these differences do not agree. Consequently, the noise detection section 50 is capable of detecting noises precisely.

2. Second Embodiment 2.1. Configuration of X-ray Detection Apparatus

Figure 15:
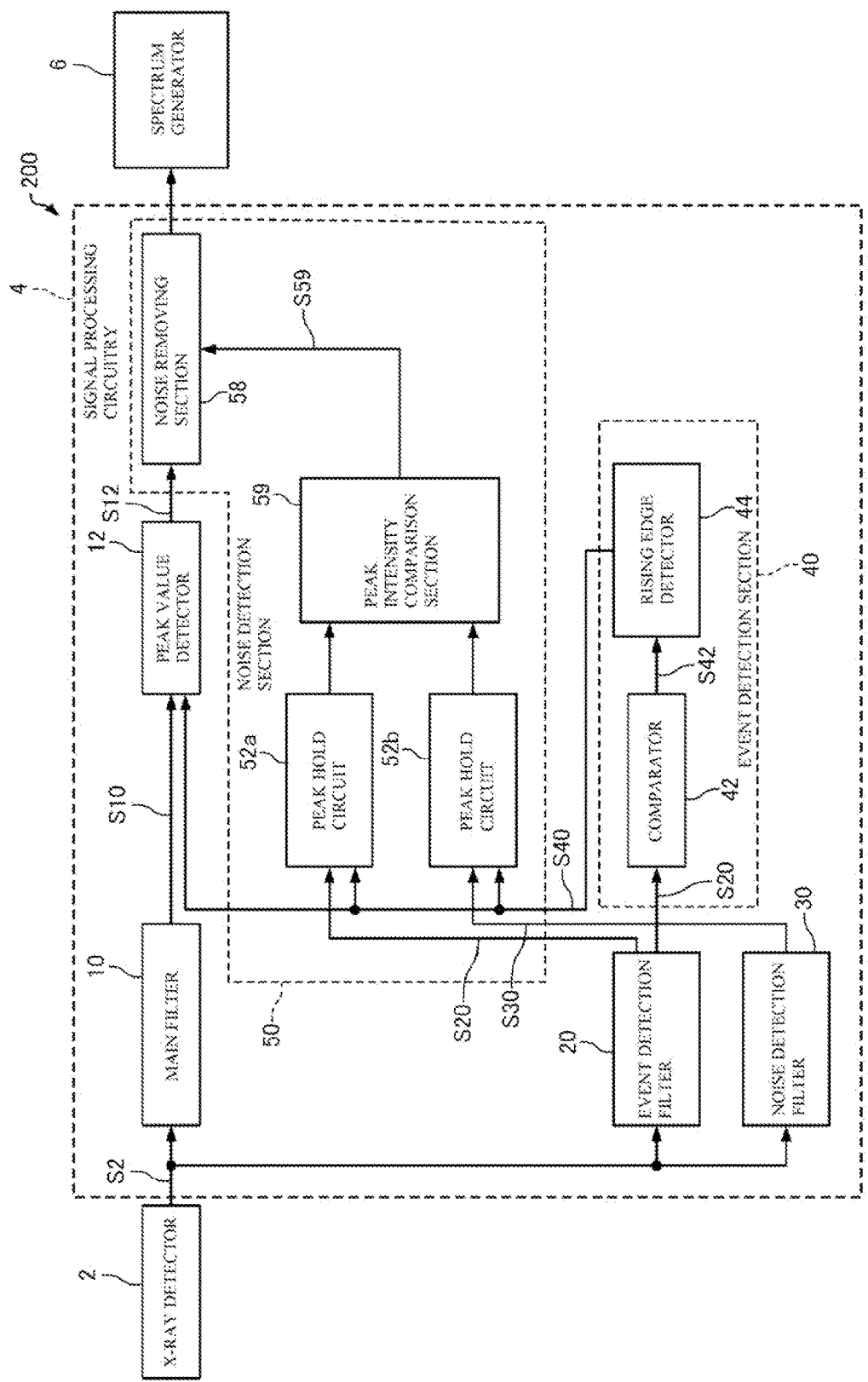
FIG. 15 is a diagram showing the configuration of an X-ray detection apparatus associated with a second embodiment.

An X-ray detection apparatus associated with a second embodiment is next described by referring to FIG. 15, in which the X-ray detection apparatus is indicated by reference numeral 200. In the following description of the X-ray detection apparatus 200, those members which are similar in function to their counterparts of the X-ray detection apparatus 100 associated with the first embodiment are indicated by the same reference numerals as in the foregoing figures and a detailed description thereof is omitted.

In the above-described X-ray detection apparatus 100, the noise detection section 50 detects noise based on the timing difference, T1−T0, (i.e., the difference between the timing T0 of the peak of the first pulsed signal S20 and the timing T1 of the peak of the second pulsed signal S30).

On the other hand, in the X-ray detection apparatus 200, the noise detection section 50 detects noise based on the peak intensities of the first pulsed signal S20 and of the second pulsed signal S30.

Figure 16:
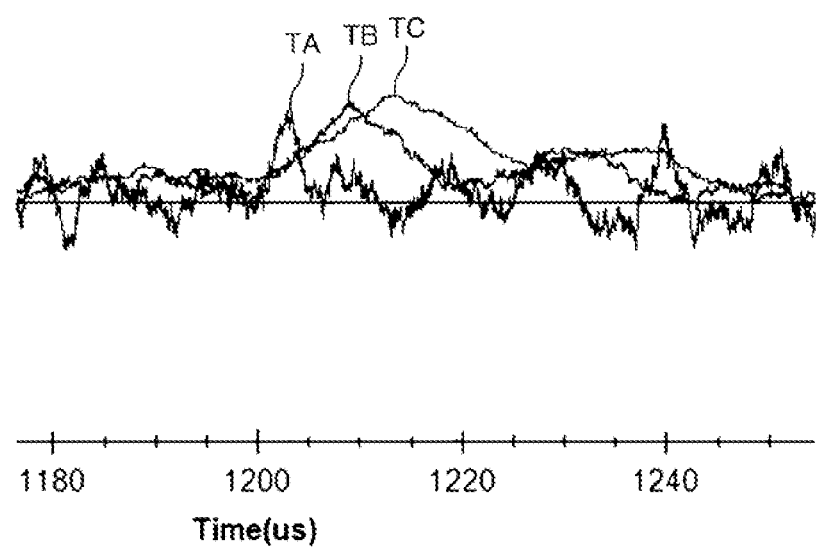
FIG. 16 is a waveform diagram of output signals from three differential filters having different time constants.
Figure 17:
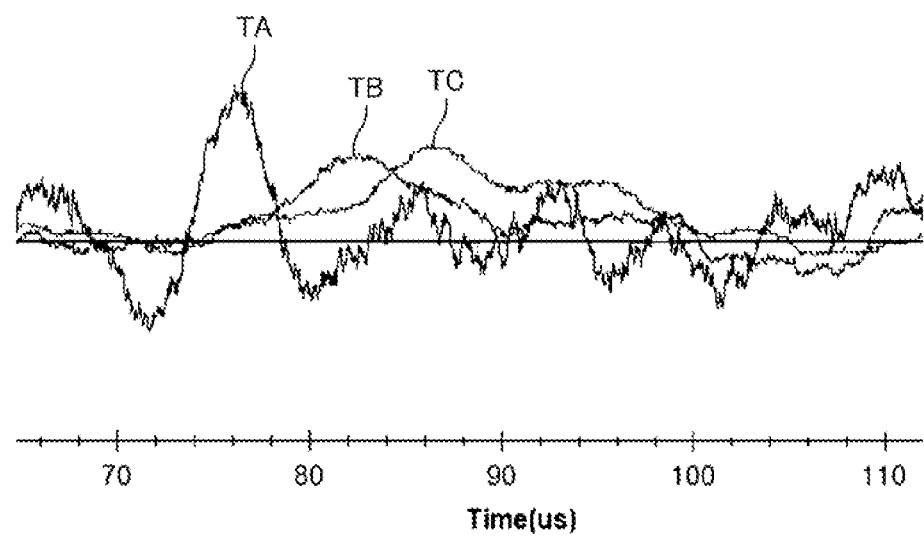
FIG. 17 is a waveform diagram similar to FIG. 16, but in which noise signals are applied.

A method of detecting noise with the noise detection section 50 is first described. FIGS. 16 and 17 show the output signals from three differential filters having different time constants, i.e., TA, TB, and TC which satisfy the magnitude relationship, TA<TB<TC. FIG. 16 shows the result of differentiation of an X-ray signal. FIG. 17 shows the result of differentiation of noise signals.

Where an X-ray signal is differentiated, the peak intensity of the output signal from the differential filter is almost constant irrespective of the magnitude of time constant as shown in FIG. 16. On the other hand, when a noise signal is differentiated, the peak intensity of the output signal from the differential filter varies according to the magnitude of time constant as shown in FIG. 17. In particular, the peak intensity tends to decrease as the time constant increases. In this way, it is possible to discriminate between noise and X-ray signal according to the peak intensities of the output signals from the differential filters having different time constants.

The noise detection section 50 detects noise based on the peak intensities of the first pulsed signal S20 and of the second pulsed signal S30. As shown in FIG. 15, the noise detection section 50 includes the peak hold circuits 52a, 52b, a peak intensity comparison section 59, and the noise removing section 58.

Figure 18:
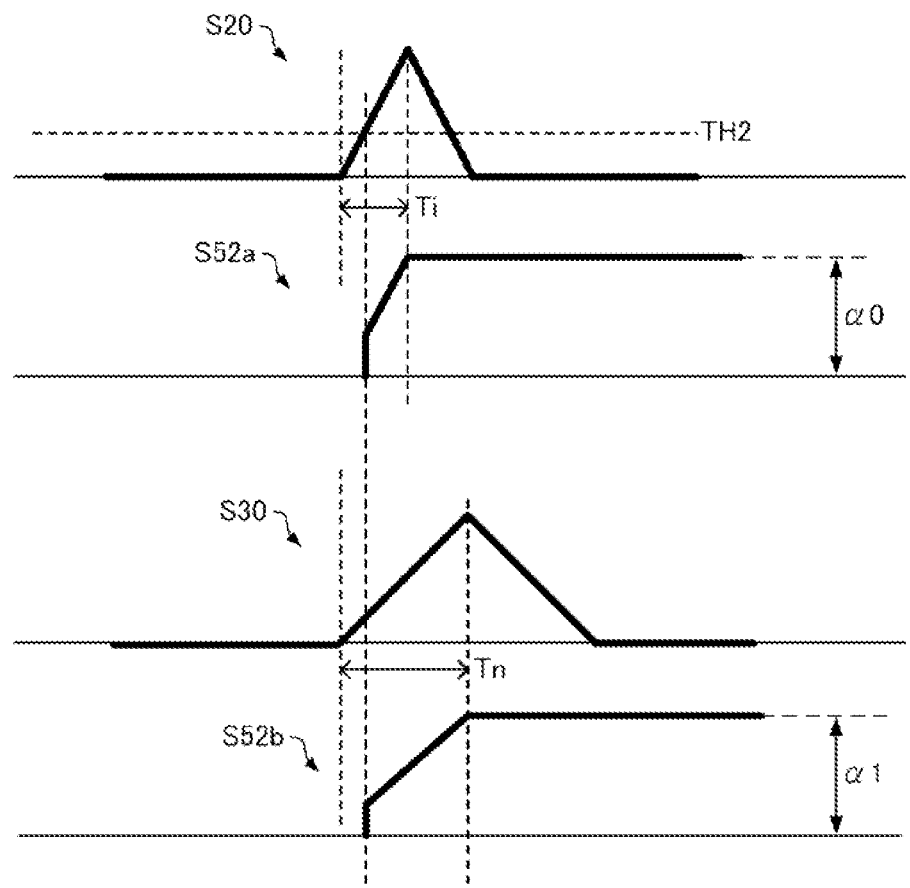
FIGS. 18 and 19 are waveform diagrams illustrating processing performed by a noise detection section.
Figure 19:
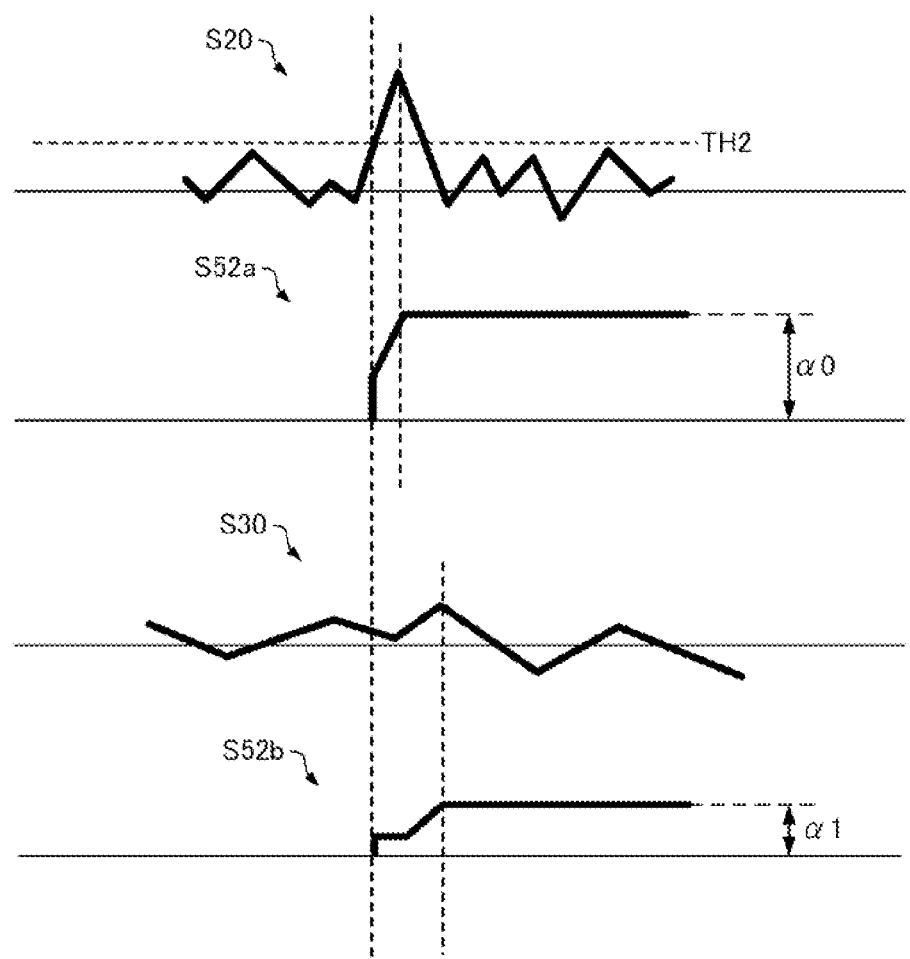

FIGS. 18 and 19 illustrate the processing performed by the noise detection section 50. FIG. 18 illustrates processing done when an X-ray signal is applied. FIG. 19 illustrates processing done when a noise signal is applied. As shown in FIGS. 18 and 19, the event detection filter 20 differentiates the output signal S2 from the X-ray detector 2 and converts it into the first pulsed signal S20.

The peak hold circuit 52a starts to detect the peak intensity (maximum value) of the first pulsed signal S20 at the timing when the first event signal S20 exceeds the threshold value TH2 and the event signal S40 occurs. The peak hold circuit 52a continues to output information about the peak intensity $\alpha 0$ of the first pulsed signal S20 during a given period.

The peak hold circuit 52b starts to detect the peak intensity (maximum value) of the second pulsed signal S30 at the timing when the first pulsed signal S20 exceeds the threshold value TH2, inducing the event signal S40. The peak hold circuit 52b keeps on outputting information about the peak intensity $\alpha 1$ of the second pulsed signal S30 during a given period. In the case of the X-ray signal shown in FIG. 18, the ratio of the peak intensity $\alpha 1$ of the first pulsed signal S20 to the peak intensity $\alpha 0$ of the second pulsed signal S30 is about 1. In the case of the noise signal shown in FIG. 19, the signal intensity ratio $\alpha 1/\alpha 0$ is less than unity.

Figure 20:
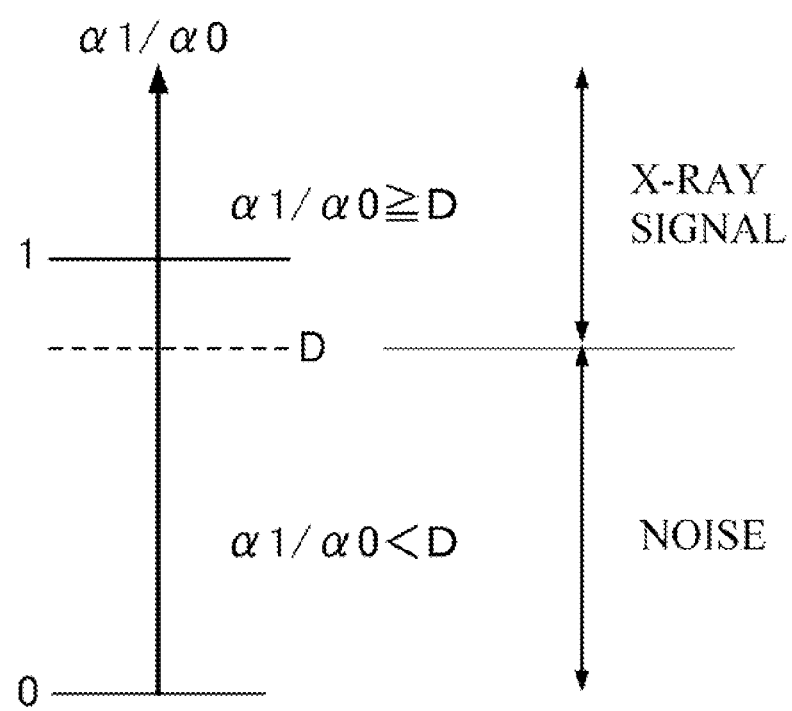
FIG. 20 is a diagram illustrating processing performed by a peak intensity comparison section.

FIG. 20 illustrates the processing performed by the peak intensity comparison section 59. The peak intensity comparison section 59 calculates the ratio of the peak intensity $\alpha 1$ of the second pulsed signal S30 to the peak intensity $\alpha 0$ of the first pulsed signal S20 and compares the calculated ratio $\alpha 1/\alpha 0$ with a threshold value D. If the intensity ratio $\alpha 1/\alpha 0$ is less than the threshold value D, the peak intensity comparison section 59 outputs the noise event signal S59. If the intensity ratio $\alpha 1/\alpha 0$ is equal to or greater than the threshold value D, the comparison section 59 does not output the noise event signal S59. The threshold value D can be set to any arbitrary value. As the threshold value D increases, noise signals can be discerned more accurately. However, if the threshold value D is set too large, it is highly likely that even X-ray signals will be discerned as noise signals.

In the foregoing description, the signal processing circuitry 4 has the single noise detection filter 30. Alternatively, the signal processing circuitry 4 may be equipped with plural noise detection filters 30 which have different time constants. In this case, the noise detection section 50 may detect noise by calculating the ratio of the peak intensity $\alpha 1$ of the second pulsed signal S30 to the peak intensity $\alpha 0$ of the first pulsed signal S20 for each noise detection filter 30.

2.2. Operation of X-ray Detection Apparatus

Figure 21:
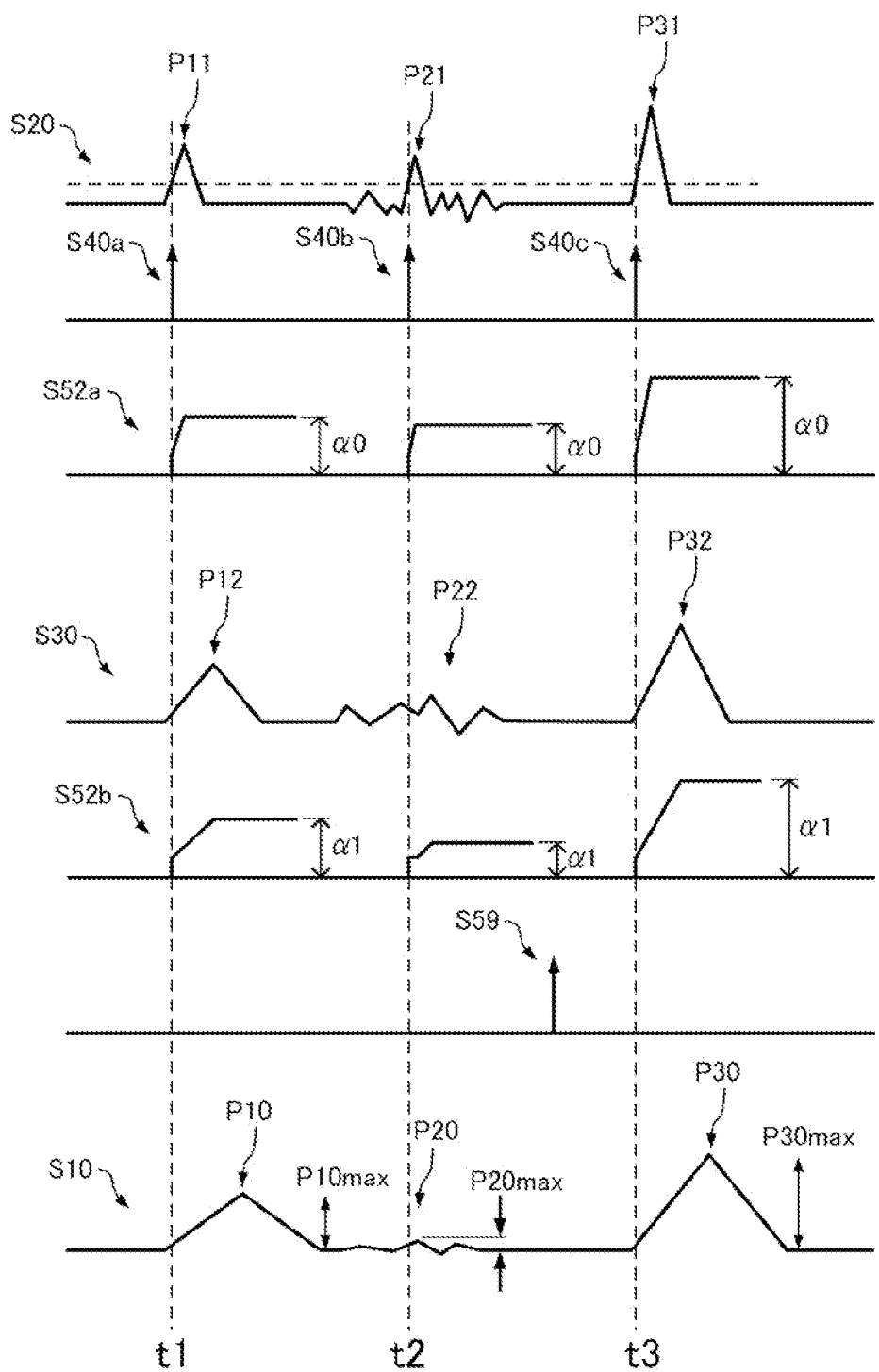
FIG. 21 is a waveform diagram illustrating processing performed by signal processing circuitry of the X-ray detection apparatus of FIG. 15.

FIG. 21 illustrates the processing performed by the signal processing circuitry 4 of the X-ray detection apparatus 200. When an X-ray impinges on the X-ray detector 2, a step corresponding to the energy of the X-ray appears on the output signal S2 from the X-ray detector 2.

The main filter 10, event detection filter 20, and noise detection filter 30 differentiate the output signal S2. As a result, peaks P10, P11, and P12 appear respectively on the main pulsed signal S10, first pulsed signal S20, and second pulsed signal S30.

In the event detection section 40, the intensity of the first pulsed signal S20 exceeds the threshold value TH2 and the event signal S40a occurs at instant t1, whereupon the peak hold circuit 52a starts to detect the peak intensity (maximum value) α0 of the first pulsed signal S20 and the peak hold circuit 52b begins to detect the peak intensity α1 of the second pulsed signal S30. The peak hold circuit 52a keeps on outputting information about the peak intensity α0 during a given period, while the peak hold circuit 52b keeps on outputting information about the peak intensity α1 during a given period.

The peak intensity comparison section 59 calculates the ratio of the peak intensity α1 of the second pulsed signal S30 to the peak intensity α0 of the first pulsed signal S20 and compares the calculated ratio α1/α0 with the threshold value D. For the event occurring at the instant t1, the intensity ratio α1/α0 is equal to or greater than the threshold value D and so the peak intensity comparison section 59 does not output the noise event signal S59.

The peak value detector 12 starts to detect the peak value (crest value) of the main pulsed signal S10 at the timing of occurrence of the event signal S40a and outputs the detection signal S12 including information about the pulse height value P10 max of the main pulsed signal S10. The noise removing section 58 outputs the detection signal S12 including the information about the pulse height value P10 max to the spectrum generator 6 because the noise event signal S59 is not applied to the removing section 58. Consequently, the information about the pulse height value P10 max of the peak P10 is sent to the spectrum generator 6.

The operation of the apparatus when noise enters the output signal S2 of the X-ray detector 2 is next described. The main filter 10, event detection filter 20, and noise detection filter 30 differentiate the output signal S2. Consequently, peaks P20, P21, and P22 appear respectively on the main pulsed signal S10, first pulsed signal S20, and second pulsed signal S30.

In the event detection section 40, the intensity of the first pulsed signal S20 exceeds the threshold value TH2 and event signal S40b occurs at instant t2, whereupon the peak hold circuit 52a starts to detect the peak intensity α0 of the first pulsed signal S20 and the peak hold circuit 52b commences to detect the peak intensity α1 of the second pulsed signal S30.

The peak intensity comparison section 59 calculates the intensity ratio α1/α0 and compares the calculated ratio α1/α0 with the threshold value D. For the event occurring at instant t2, the intensity ratio α1/α0 is less than the threshold value D and so the comparison section 59 outputs the noise event signal S59.

At the timing of occurrence of the event signal S40b, the peak value detector 12 starts to detect the peak value of the main pulsed signal S10 and outputs the detection signal S12 including information about the peak value P20 max of the main pulsed signal S10. Since the noise event signal S59 is applied, the noise removing section 58 does not output the detection signal S12 to the spectrum generator 6. Accordingly, the information about the peak value P20 max of the peak P20 is not sent to the spectrum generator 6.

Similar processing is performed for the event occurring at instant t3. The main filter 10, event detection filter 20, and noise detection filter 30 differentiate the output signal S2, resulting in peaks P30, P31, and P32 respectively on the main pulsed signal S10, first pulsed signal S20, and second pulsed signal S30. For the event occurring at instant t3, the intensity ratio α1/α0 is equal to or greater than the threshold value D and, therefore, the peak intensity comparison section 59 does not output the noise event signal S59. Consequently, the information about the peak value P30 max of the peak P30 is sent to the spectrum generator 6.

By repeating the above-described processing, the information about the peak value is sent from the signal processing circuitry 4 to the spectrum generator 6 only if the noise detection section 50 determines that there is an event generated by an X-ray signal. As a consequence, the spectrum generator 6 can create a spectrum experiencing less effect from noise.

2.3. Advantageous Effects

The X-ray detection apparatus 200 includes the X-ray detector 2, the event detection filter 20 for differentiating the output signal S2 from the X-ray detector 2 and converting the signal into the first pulsed signal S20, the noise detection filter 30 having a time constant greater than that of the event detection filter 20 and operative to differentiate the output signal S2 from the X-ray detector 2 and converting the signal into the second pulsed signal S30, and the noise detection section 50 for detecting noise based on both the peak intensity α0 of the first pulsed signal S20 and the peak intensity α1 of the second pulsed signal S30. Therefore, the X-ray detection apparatus 200 can effectively discriminate between noise and X-ray signal in the same way as the X-ray detection apparatus 100.

3. Third Embodiment

Figure 22:
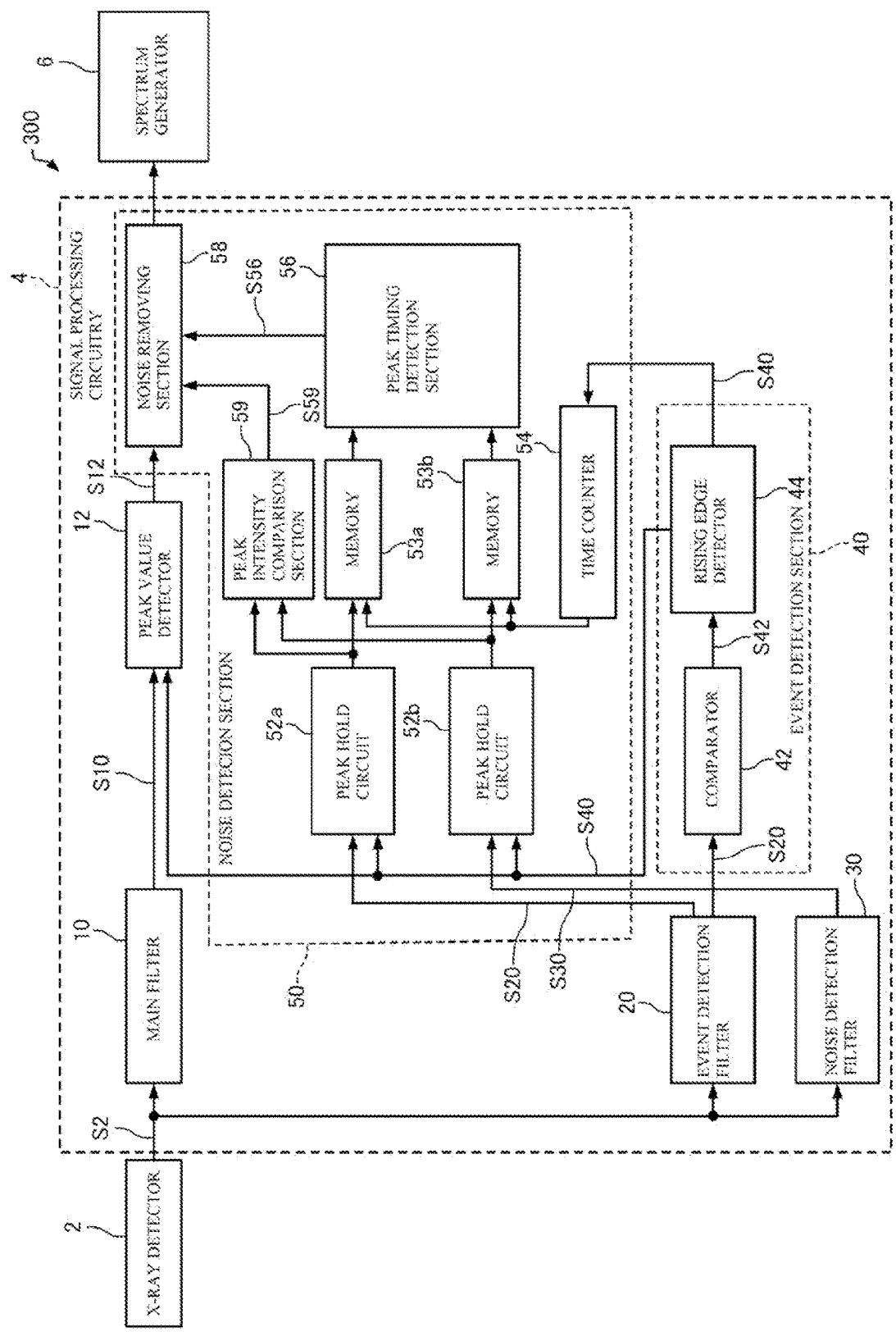
FIG. 22 is a diagram showing the configuration of an X-ray detection apparatus associated with a third embodiment.

An X-ray detection apparatus associated with a third embodiment is next described by referring to FIG. 22, which shows the configuration of the X-ray detection apparatus, 300, associated with the third embodiment. In the following description of the X-ray detection apparatus 300, those members of the apparatus 300 which are similar in function to their counterparts of the X-ray detection apparatus 100 associated with the first embodiment and the X-ray detection apparatus 200 associated with the second embodiment are indicated by the same reference numerals as in the foregoing figures and a detailed description thereof is omitted.

In the X-ray detection apparatus 300, the noise detection section 50 detects noise based on the difference (T1−T0) between the timing T0 of the peak of the first pulsed signal S20 and the timing T1 of the peak of the second pulsed signal S30 and also based on the intensity ratio α1/α0 of the peak intensity α1 of the second pulsed signal S30 to the peak intensity α0 of the first pulsed signal S20.

As shown in FIG. 22, the noise detection section 50 includes peak hold circuits 52a, 52b, memories 53a, 53b, a time counter 54, a peak timing detection section 56, a noise removing section 58, and a peak intensity comparison section 59.

In the X-ray detection apparatus 300, the peak hold circuit 52a sends information about the detected peak intensity (maximum value) to the memory 53a and to the peak intensity comparison section 59. The peak hold circuit 52b sends information about the detected peak intensity to the second memory 53b and to the peak intensity comparison section 59.

The noise removing section 58 receives the noise event signal S56 from the peak timing detection section 56 and the noise event signal S59 from the peak intensity comparison section 59. The noise removing section 58 makes a decision as to whether the detection signal S12 is output to the spectrum generator 6 based on these noise event signals S56 and S59.

If at least one of the noise event signals S56 and S59 is applied, for example, the noise removing section 58 may determine that there is noise and may not output the detection signal S12. If both noise event signals S56 and S59 are applied, for example, the noise removing section 58 may determine that there is noise and may not output the detection signal S12.

The X-ray detection apparatus 300 is capable of effectively discriminating between noise and X-ray signal in the same manner as the X-ray detection apparatuses 100 and 200.

4. Fourth Embodiment

Figure 23:
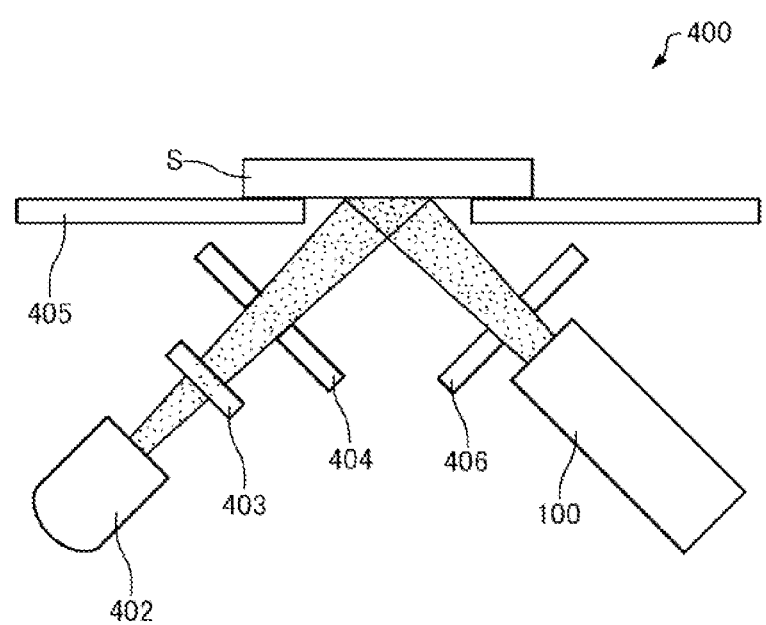
FIG. 23 is a diagram showing the configuration of a sample analysis apparatus associated with a fourth embodiment.

A sample analysis apparatus associated with a fourth embodiment is next described by referring to FIG. 23, which shows the configuration of the sample analysis apparatus, 400, associated with the fourth embodiment.

The sample analysis apparatus 400 is an instrument for performing analysis by X-ray fluorescence spectrometry. In particular, primary X-rays are directed at a sample S, inducing secondary X-rays which are detected for analysis of the sample S.

As shown in FIG. 23, the sample analysis apparatus 400 includes an X-ray tube 402, a filter 403, a primary X-ray collimator 404, a sample support plate 405, a secondary X-ray collimator 406, and the X-ray detection apparatus 100.

The X-ray tube 402 produces primary X-rays. The voltage and current applied to the X-ray tube 402 are set according to the material of the sample S and the element to be analyzed. The X-rays produced from the X-ray tube 402 are directed at the sample S via the filter 403 and the primary X-ray collimator 404.

By irradiating the sample S with the X-rays through the filter 403, some of continuous X-rays or characteristic X-rays can be absorbed into the filter 403 and their constituents can be removed. The sample analysis apparatus 400 is equipped with the plural filters 403 which may have different attenuating energy bands. The filter used for measurement is selected from these filters 403 according to the element to be measured.

The primary X-ray collimator 404 limits the area of the sample S irradiated with X-rays and permits the user to vary the size of the irradiated area. The sample support plate 405 supports the sample S and is provided with an opening through which the primary X-rays hit the sample S.

The secondary X-ray collimator 406 restricts the spatial region through which the secondary X-rays radiated from the sample S can pass and thus only these passed X-rays can be detected. Only secondary X-rays of interest can be efficiently detected by the X-ray detection apparatus 100 through the use of the X-ray collimator 406. The secondary X-rays are radiated from the sample S when it is irradiated with primary X-rays.

The X-ray detection apparatus 100 detects the secondary X-rays emanating from the sample S. The apparatus 100 creates an X-ray spectrum based on detection of the secondary X-rays.

Since the sample analysis apparatus 400 includes the X-ray detection apparatus 100, the effects of noise can be reduced. Also, the sensitivity to low-energy X-rays can be improved.

The sample analysis apparatus associated with the present invention is an X-ray fluorescence spectrometer which irradiates a sample with X-rays to produce X-rays and which detects the produced X-rays with the radiation detection apparatus associated with the present invention. The sample analysis apparatus associated with the present invention may also be an instrument which irradiates a sample with an electron beam, ions, or the like to induce X-rays or gamma rays from the sample and which detects the induced X-rays or gamma rays by the radiation detection apparatus associated with the present invention. Examples of the sample analysis apparatus associated with the present invention include an electron microscope equipped with the radiation detection apparatus associated with the present invention (such as a transmission electron microscope (TEM), a scanning transmission electron microscope (STEM), or a scanning electron microscope (SEM)) and an electron probe microanalyzer (EPMA) equipped with the radiation detection apparatus associated with the present invention.

The present invention is not restricted to the foregoing embodiments but rather can be implemented in various modified forms. For example, the present invention embraces configurations (e.g., configurations identical in function, method, and results or identical in purpose and advantageous effects) which are substantially identical to the configurations described in any one of the above embodiments. Furthermore, the invention embraces configurations which are similar to the configurations described in any one of the above embodiments except that their nonessential portions have been replaced. Additionally, the invention embraces configurations which are identical in advantageous effects to, or which can achieve the same object as, the configurations described in any one of the above embodiments. Further, the invention embraces configurations which are similar to the configurations described in any one of the above embodiments except that a well-known technique is added.

What is claimed is:

1. A radiation detection apparatus comprising:
a detector operative to detect radiation and to produce a detector output signal;
a first differential filter having a time constant and operative to differentiate and convert the detector output signal into a first pulsed signal;
a second differential filter having a time constant greater than that of the first differential filter and operative to differentiate and convert the detector output signal into a second pulsed signal; and
a noise detection section for detecting noise based on a difference in timing between a peak of the first pulsed signal and a peak of the second pulsed signal.

2. A radiation detection apparatus as set forth in claim 1, wherein said noise detection section detects noise by comparing the difference in timing between the peak of said first pulsed signal and the peak of said second pulsed signal with a difference in time constant between said first differential filter and said second differential filter.

3. A radiation detection apparatus as set forth in claim 1, wherein said noise detection section detects noise based further on peak intensities of said first pulsed signal and of said second pulsed signal.

4. A radiation detection apparatus as set forth in claim 1, further comprising:
a main filter having a time constant greater than both of the time constant of said first differential filter and the time constant of said second differential filter and operative to differentiate said detector output signal and to output a main pulsed signal;
an event detection section for outputting an event signal based on said first pulsed signal; and a peak value detector for starting detection of a peak value of the main pulsed signal in response to the event signal and for outputting a signal including information about the peak value.

5. A radiation detection apparatus as set forth in claim 1, wherein said detector output signal takes the form of a staircase waveform having amplitude steps corresponding to energies of said radiation.

6. A sample analysis apparatus including a radiation detection apparatus as set forth in claim 1.

7. A radiation detection apparatus comprising:
- a detector operative to detect radiation and to produce a detector output signal;
- a first differential filter having a time constant and operative to differentiate and convert the detector output signal into a first pulsed signal;
- a second differential filter having a time constant greater than that of the first differential filter and operative to differentiate and convert the detector output signal into a second pulsed signal; and
- a noise detection section for detecting noise based on peak intensities of the first pulsed signal and of the second pulsed signal, wherein said noise detection section detects noise based on a ratio of the peak intensity of said second pulsed signal to the peak intensity of said first pulsed signal.

* * * * *